United States Patent
Li et al.

(10) Patent No.: US 12,514,879 B2
(45) Date of Patent: Jan. 6, 2026

(54) USE OF ACELLULAR ADIPOSE TISSUE EXTRACT IN PROMOTING HAIR GROWTH AND RETENTION

(71) Applicant: SHANGHAI CELLEAF BIOTECHNOLOGY CO., LTD., Shanghai (CN)

(72) Inventors: Wei Li, Shanghai (CN); Wenjie Zhang, Shanghai (CN); Xiangsheng Wang, Shanghai (CN); Ziyou Yu, Shanghai (CN)

(73) Assignee: SHANGHAI CELLEAF BIOTECHNOLOGY CO., LTD., Shanghai (CN)

( * ) Notice: Subject to any disclaimer, the term of this patent is extended or adjusted under 35 U.S.C. 154(b) by 894 days.

(21) Appl. No.: 17/768,587

(22) PCT Filed: Oct. 16, 2020

(86) PCT No.: PCT/CN2020/121639
§ 371 (c)(1),
(2) Date: Apr. 13, 2022

(87) PCT Pub. No.: WO2021/073620
PCT Pub. Date: Apr. 22, 2021

(65) Prior Publication Data
US 2023/0130577 A1 Apr. 27, 2023

(30) Foreign Application Priority Data
Oct. 17, 2019 (CN) .......................... 201910990079.X

(51) Int. Cl.
| A61K 35/35 | (2015.01) |
| A61K 8/98 | (2006.01) |
| A61K 9/00 | (2006.01) |
| A61P 17/14 | (2006.01) |
| A61Q 7/00 | (2006.01) |

(52) U.S. Cl.
CPC .............. *A61K 35/35* (2013.01); *A61K 8/981* (2013.01); *A61K 9/0021* (2013.01); *A61P 17/14* (2018.01); *A61Q 7/00* (2013.01)

(58) Field of Classification Search
None
See application file for complete search history.

(56) References Cited

U.S. PATENT DOCUMENTS

| 9,173,921 B1 | 11/2015 | Lim | |
| 10,022,313 B2 * | 7/2018 | Ling | ....................... A61Q 19/08 |
| 2014/0205563 A1 * | 7/2014 | Maguire | .............. C12N 5/0628 424/85.5 |
| 2016/0220731 A1 * | 8/2016 | Conlan | ............... A61L 27/3834 |
| 2019/0167763 A1 * | 6/2019 | Khorakiwala | ......... A61K 9/107 |

FOREIGN PATENT DOCUMENTS

| CN | 102143755 | A | 8/2011 | |
| CN | 104840371 | A | 8/2015 | |
| CN | 108236614 | A | 7/2018 | |
| CN | 108355170 | A | 8/2018 | |
| CN | 109069817 | A | 12/2018 | |
| CN | 109077938 | A | * 12/2018 | ........... A61K 8/0212 |
| CN | 109803671 | A | 5/2019 | |
| JP | 2003192541 | A | 7/2003 | |
| KR | 20180137781 | A | 12/2018 | |
| WO | 2012091321 | A2 | 7/2012 | |

OTHER PUBLICATIONS

Yu, Ziyou et al.; "Fat extract promotes angiogenesis in a murine model of limb ischemia: a novel cell-free thrapeutic strategy"; Stem Cell Research & Therapy; vol. 9; Nov. 8, 2018; pp. 1-14.

Park, Byung-Soon et al.; "Hair growth stimulated by conditioned medium of adipose-derived stem cells is enhanced by hypoxia: evidence of increased growth factor secretion"; Biomedical Research, Biomedical Research Press Inc, vol. 31, No. 1; Feb. 1, 2010; ISSN: 0388-6107; pp. 27-34.

Mohammad, Ali et al.; "Autologous adipose transplantation an effective method to treat alopecia after trauma: a case report"; Clinical, Cosmetic and Investigational Dermatology; vol. 12; Sep. 1, 2019; pp. 647-651.

Wang, Xiangsheng et al.; "Cell-free fat extract accelerates diabetic wound healing in db/db mice"; Am J Transl Res; vol. 12, No. 8; ISSN.: 1943-8141; Jan. 1, 2020; pp. 4216-4227, 1(Fig).

Xu, Yuda et al.; "Cell-free Fat Extract Increases Dermal Thickness by Enhancing Angiogenesis and Extracellular Matrix Production in Nude Mice"; Aesthetic Surgery Journal; vol. 40, No. 8; ISSN: 1090-820X; Jul. 13, 2020; pp. 904-913.

(Continued)

*Primary Examiner* — Nghi V Nguyen

(74) *Attorney, Agent, or Firm* — NKL Law; Bin Lu; Allen Xue

(57) ABSTRACT

A use of acellular adipose tissue extract in promoting hair growth and retention. The acellular adipose tissue extract contains one or more components selected from the following: an insulin-like growth factor, a brain-derived neurotrophic factor, a glia-derived neurotrophic factor, a vascular endothelial growth factor, a liver growth factor, transforming growth factor β, a basic fibroblast growth factor, a platelet-derived growth factor, an epidermal growth factor, a granulocyte colony stimulating factor, or a combination thereof.

14 Claims, 2 Drawing Sheets

(56) References Cited

OTHER PUBLICATIONS

Kan, Tianyou et al.; "Cell-free fat extract-loaded microneedles attenuate inflammation-induced apoptosis and mitochondrial damage in tendinopathy"; Materials Today Bio; vol. 22, 100738; ISSN.: 2590-0064; Aug. 1, 2023; pp. 1-15.

Quan, Ying-Shu; "Development of the hair growth formulation by using a dissolving microneedle technology"; Fragrance Journal; Oct. 2018; pp. 25-29.

Tonnard, Patrick et al., "Nanofat Grafting: Basic Research and Clinical Applications", Plastic and Reconstructive Surgery, vol. 132, No. 4, pp. 1017-1026, Oct. 2013.

\* cited by examiner

USE OF ACELLULAR ADIPOSE TISSUE EXTRACT IN PROMOTING HAIR GROWTH AND RETENTION

TECHNICAL FIELD

The present invention belongs to the field of biotechnology, in particular, relates to the use of acellular adipose tissue extract in promoting hair growth and retention.

BACKGROUND TECHNIQUE

Alopecia is a common and frequently-occurring skin disease characterized by hair loss. It can be roughly classified as two categories: non cicatricial alopecia and cicatricial alopecia according to the pathology. Among them, non cicatricial alopecia can be further classified as androgenic alopecia, alopecia areata, telogen alopecia, and anagen alopecia, etc.; cicatricial alopecia can be classified as chronic cutaneous lupus erythematosus, hair lichen planus, etc. The pathogenesis of alopecia is not completely clear, but it is generally believed to be related to heredity, endocrine function, infection lesions, autoimmune function, mental factors, and nutritional status.

At present, there are limited means to treat alopecia. Drug therapy and physical therapy are mainly aimed at promoting blood circulation, improving local blood supply to the hair loss site, promoting hair regeneration and prolonging the growth period of hair. Because alopecia is more common in young adults, it affects the appearance, and usually brings mental distress and mental pain to patients.

Therefore, there is an urgent need to provide products that can effectively promote hair growth and/or retention.

SUMMARY OF THE INVENTION

The object of the present invention is to provide a use of an acellular adipose tissue extract for the preparation of a product for promoting hair growth and/or retention.

In the first aspect of the present invention, it provides a use of an acellular adipose tissue extract for the preparation of a composition or product, the composition or product is used for promoting hair regeneration and/or retention.

In another preferred embodiment, the acellular adipose tissue extract is extracted from adipose tissue, preferably, from allogeneic adipose tissue, more preferably, human adipose tissue.

In another preferred embodiment, the acellular adipose tissue extract contains one or more components selected from the group consisting of insulin-like growth factor (IGF-1), brain-derived neurotrophic factor (BDNF), glial-derived neurotrophic factor (GDNF), vascular endothelial growth factor (VEGF), liver growth factor (HGF), transforming growth factor β (TGF-β), basic fibroblast growth factor (bFGF), platelet derived factor (PDGF), epidermal growth factor (EGF), granulocyte colony stimulating factor (G-CSF), and a combination thereof.

In another preferred embodiment, in the adipose extract without added ingredients, the concentration of IGF-1 is 5000-30000 pg/ml, preferably 6000-20000 pg/ml, more preferably 7000-15000 pg/ml, more preferably 8000-12000 pg/ml, more preferably 9000-11000 pg/ml, more preferably 9500-10500 pg/ml.

In another preferred embodiment, in the adipose extract without added ingredients, the concentration of BDNF is 800-5000 pg/ml, preferably 1000-4000 pg/ml, more preferably 1200-2500 pg/ml pg/ml, more preferably 1400-2000 pg/ml, more preferably 1600-2000 pg/ml, more preferably 1700-1850 pg/ml.

In another preferred embodiment, in the adipose extract without added ingredients, the concentration of GDNF is 800-5000 pg/ml, preferably 1000-4000 pg/ml, more preferably 1200-2500 pg/ml pg/ml, more preferably 1400-2000 pg/ml, more preferably 1600-2000 pg/ml, more preferably 1700-1900 pg/ml.

In another preferred embodiment, in the adipose extract without added ingredients, the concentration of bFGF is 50-600 pg/ml, preferably 100-500 pg/ml, more preferably 120-400 pg/ml, more preferably 150-300 pg/ml, more preferably 200-280 pg/ml, more preferably 220-260 pg/ml.

In another preferred embodiment, in the adipose extract without added ingredients, the concentration of the VEGF is 50-500 pg/ml, preferably 100-400 pg/ml, more preferably 120-300 pg/ml, more preferably 150-250 pg/ml, more preferably 170-230 pg/ml, more preferably 190-210 pg/ml.

In another preferred embodiment, in the adipose extract without added ingredients, the concentration of TGF-β1 is 200-3000 pg/ml, preferably 400-2000 pg/ml, more preferably 600-1500 pg/ml, more preferably 800-1200 pg/ml, more preferably 800-1100 pg/ml, more preferably 900-1000 pg/ml.

In another preferred embodiment, in the adipose extract without added ingredients, the concentration of the HGF is 200-3000 pg/ml, preferably 400-2000 pg/ml, more preferably 600-1500 pg/ml, more preferably 600-1200 pg/ml, more preferably 800-1000 pg/ml, more preferably 850-950 pg/ml.

In another preferred embodiment, in the adipose extract without added ingredients, the concentration of PDGF is 50-600 pg/ml, preferably 80-400 pg/ml, more preferably 100-300 pg/ml, more preferably 140-220 pg/ml, more preferably 160-200 pg/ml, more preferably 170-190 pg/ml.

In another preferred embodiment, the weight ratio of IGF-1 to VEGF is 20-100:1, preferably 30-70:1, more preferably 40-60:1, and most preferably 45-55:1.

In another preferred embodiment, the weight ratio of BDNF to VEGF is 2-20:1, preferably 4-15:1, more preferably 6-12:1, and most preferably 8-9.5:1.

In another preferred embodiment, the weight ratio of GDNF to VEGF is 2-20:1, preferably 4-15:1, more preferably 6-12:1, and most preferably 8.5-9.5:1.

In another preferred embodiment, the weight ratio of bFGF to VEGF is 0.2-8:1, preferably 0.5-5:1, more preferably 0.6-2:1, more preferably 0.8-1.6:1, and most preferably 1-1.5:1.

In another preferred embodiment, the weight ratio of TGF-β1 to VEGF is 1-20:1, preferably 1-15:1, more preferably 1-10:1, more preferably 2-8:1, more preferably 4-6:1.

In another preferred embodiment, the weight ratio of HGF to VEGF is 1-20:1, preferably 1-15:1, more preferably 1-10:1, more preferably 2-8:1, more preferably 4-5.5:1.

In another preferred embodiment, the weight ratio of PDGF to VEGF is 0.1-3:1, preferably 0.2-2:1, more preferably 0.4-1.5:1, and most preferably 0.7-1.2:1.

In another preferred embodiment, the acellular adipose tissue extract is liquid.

In another preferred embodiment, the acellular adipose tissue extract contains no lipid droplet.

In another preferred embodiment, the lipid droplets are oil droplets released after fat cells are disrupted.

In another preferred embodiment, the expression of "contain no lipid droplet" means that in the fat extract, the volume of oil droplets accounts for less than 1% of the total liquid, preferably less than 0.5%, more preferably less than 0.1% of the total liquid.

In another preferred embodiment, the acellular adipose tissue extract contains no cell.

In another preferred embodiment, the cells are selected from the group consisting of endothelial cells, adipose stem cells, macrophages, and stromal cells.

In another preferred embodiment, the expression of "contain no cell" means that the average number of cells in 1 ml of the fat extract is <1, preferably <0.5, more preferably <0.1, or 0.

In another preferred embodiment, the fat extract is not SVF.

In another preferred embodiment, the fat extract is a naturally-obtained nano-fat extract without added ingredients.

In another preferred embodiment, the acellular adipose tissue extract is free of added ingredients.

In another preferred embodiment, the expression of "without added ingredients" means that no solution, solvent, small molecule, chemical, and biological additive are added during the preparation of the adipose extract except rinsing step.

In another preferred embodiment, the acellular adipose tissue extract is obtained by subjecting the adipose tissue to mechanically cutting, chylolysis, repeating freezing and thawing, and then centrifuging.

In another preferred embodiment, the acellular adipose tissue extract is obtained by the method comprising the following steps:

(1) providing an adipose tissue raw material, shredding the adipose tissue raw material, and rinsing (eg, with physiological saline), thereby obtaining a rinsed adipose tissue;

(2) centrifuging the rinsed adipose tissue to obtain a layered mixture;

(3) discharging the excess liquid at the bottom and the grease on top from the layered mixture and collecting the intermediate layer (that is, the fat layer containing adipocytes);

(4) subjecting the intermediate layer to mechanical emulsification to obtain a mechanically emulsified fat mixture (also called nano fat);

(5) centrifuging the mechanically emulsified fat mixture (may be combined or not) to obtain a transparent (or substantially transparent) intermediate liquid layer, which is an adipose primary extract; and (6) subjecting the adipose primary extract to filtration and sterilization to obtain the adipose extract without added ingredients.

In another preferred embodiment, before the centrifugation step of step (5), the method further comprises subjecting the mechanically emulsified fat mixture to a freeze-thaw treatment.

In another preferred embodiment, in step (5), the mechanically emulsified fat mixture is freeze-thawed one or more times (eg, 1, 2, 3, 4, 5 times), and then the thawed mixture is centrifuged, and the transparent liquid in the middle of the centrifuge tube is collected, which is the adipose primary extract.

In another preferred embodiment, in step (6), the filtration and sterilization are performed through a filter (eg, a 0.22 μm filter).

In another preferred embodiment, in step (6), the filtration and sterilization are performed by first passing through a first filter that can filter out cells, and then passing through a second filter (such as a 0.22 μm filter) that can filter out pathogens (such as bacteria).

In another preferred embodiment, in step (6), further comprising sub-packaging the adipose extract to form a sub-packed product. (The sub-packaged extract may be stored at −20° C. for later use; may be thawed at room temperature then used directly, or thawed and stored at a low temperature (eg, 4° C.) for a period of time before use).

In another preferred embodiment, step (a) of the method further comprises providing an adipose tissue, and centrifuging the adipose tissue (preferably at 800-2500 rpm, more preferably at 1000-1500 rpm, most preferably at 1200 rpm) to obtain an intermediate fat layer located in the middle layer.

In another preferred embodiment, step (b) of the method further comprises freezing and thawing (preferably repeated freezing and thawing, such as repeated freezing and thawing 1-3 times) to obtain nano fat.

In another preferred embodiment, the emulsification is mechanical emulsification.

In another preferred embodiment, the emulsification is mechanical emulsification by repeatedly blowing through a syringe for many times (eg, 30-200 times, preferably 50-150 times).

In another preferred embodiment, the emulsification is a method of breaking up by a tissue homogenizer.

In another preferred embodiment, the promoting hair growth and/or retention comprises promoting the proliferation and/or activation of dermal papilla cells, delaying the degeneration of hair follicle cells, promoting the telogen hair follicles to enter the anagen phase, or a combination thereof.

In another preferred embodiment, the promoting hair growth includes promoting hair regeneration and/or hair growth and/or hair thickening.

In another preferred embodiment, the hair retention includes reducing hair loss and/or strengthening hair roots.

In another preferred embodiment, the promoting hair growth and/or retention includes treating and/or preventing alopecia, preferably, the alopecia includes cicatricial alopecia and/or non cicatricial alopecia.

In another preferred embodiment, the cicatricial alopecia is selected from the group consisting of hair lichen planus, postmenopausal alopecia, lupus erythematosus alopecia, Brocq pseudoalopecia areata, dissecting celhlitis of the scalp, or a combination thereof.

In another preferred embodiment, the non cicatricial alopecia is selected from the group consisting of androgenetic alopecia, alopecia areata, temporal triangle alopecia, trichotillomania, senile alopecia, telogen effluvium, anagen hair loss syndrome, infectious alopecia, lipoedema alopecia, salt alopecia, sugar alopecia, tumor-related alopecia, or a combination thereof, preferably androgenetic alopecia, temporal triangle alopecia, telogen effluvium, infectious alopecia, and/or psychogenic alopecia.

In another preferred embodiment, the composition or product is selected from the group consisting of hair growth and/or retention lotion, hair growth and/or retention ointment, hair growth and/or retention compress, shampoo, conditioner, hair gel, mousse, lotion, hair cream, hair mask, hair dye, eyebrow rejuvenator, eyelash rejuvenator or eyelash nourisher, hair serum, scalp conditioner, or a combination thereof.

In another preferred embodiment, the composition or product contains at least 1 wt %, at least 5 wt %, at least 20 wt %, at least 30 wt %, at least 40 wt %, at least 50 wt %, at least 60 wt %, at least 70 wt % %, at least 80 wt % or at least 90 wt % of the acellular adipose tissue extract, preferably 95 wt %, more preferably 98 wt %, most preferably 99 wt %, based on the total weight of the composition or product.

In another preferred embodiment, the composition or product further includes a pharmaceutically or cosmetically acceptable carrier or excipient.

In another preferred embodiment, the cosmetically acceptable carrier or excipient is selected from the group consisting of moisturizing agents, antioxidants, anti-ultraviolet agents, preservatives, film-forming agents, oil-soluble gelling agents, organic modified clay minerals, resins, antibacterial agents, fragrances, salts, pH adjusters, chelating agents, cooling agents, anti-inflammatory agents, ingredients for skin beautification, vitamins, amino acids, nucleic acids, hormones, inclusion compounds, and a combination thereof.

In the second aspect of the present invention, it provides a compress for promoting hair regeneration and/or retention, which comprises:

a substrate, and an array of microneedles immobilized on the substrate, and the compress contains acellular adipose tissue extract as active ingredient.

In another preferred embodiment, the acellular tissue extract is obtained by drying the acellular tissue extract.

In another preferred embodiment, the acellular adipose tissue extract is mixed with a carrier to form microneedles.

In another preferred embodiment, the carrier is selected from water-soluble macromolecules, liposomes, salts, or a combination thereof.

In another preferred embodiment, the acellular tissue extract is prepared into an elastic gel, and the elastic gel is coated on the surface of the substrate (and the microneedles) to form an elastic gel layer.

In another preferred embodiment, the elastic gel layer includes a coagulant, and the coagulant is natural, semisynthetic or synthetic polymer material, such as polysaccharides (starch, cellulose, alginic acid, hyaluronic acid, or chitosan) and polypeptides (collagen, poly-L-lysine or poly-L-glutamic acid), synthetic polymers (povidone, polyethylene, or polyacrylic acids (such as carbomer, polyacrylic acid)), or a combination thereof.

In another preferred embodiment, the elastic gel layer may further contain skin beautifying ingredients.

In another preferred embodiment, the distance between the top of the microneedle and the upper surface of the elastic hydrogel layer is 200-500 μm, preferably 200-300 μm.

In another preferred embodiment, the microneedles can reach the dermis, preferably the papillary layer of the dermis (also called the superficial dermis).

In another preferred embodiment, the length of the microneedles is 0.05 mm-1.5 mm, preferably 0.1 mm-1.0 mm, more preferably 0.2 mm-0.5 mm.

In another preferred embodiment, the distance between adjacent microneedles is 0.8-1.5 mm, preferably 1-1.2 mm.

In another preferred embodiment, the area of the compress is 0.0001-0.1 $m^2$, preferably 0.005-0.05 $m^2$, 0.001-0.02 $m^2$.

In another preferred embodiment, the substrate is a flexible substrate.

In another preferred embodiment, the material of the substrate is a hyposensitive or desensitized material.

In the third aspect of the present invention, it provides a method for promoting hair regeneration and/or retention, the method comprising the step of: administering the acellular adipose tissue extract of the present invention or the compress in the second aspect of the present invention to a subject in need thereof.

In another preferred embodiment, the subject is a human or a non-human mammal.

In another preferred embodiment, the non-human mammal is rat, mouse, cat, dog, pig, cow, sheep or monkey.

It should be understood that, within the scope of the present invention, the above technical features of the present invention and the technical features specifically described in the following descriptions (such as the examples) can be combined with each other to form a new or preferred technical solution. Due to space limitations, they will not be repeated herein.

DETAILED DESCRIPTION OF THE INVENTION

Figure 1:
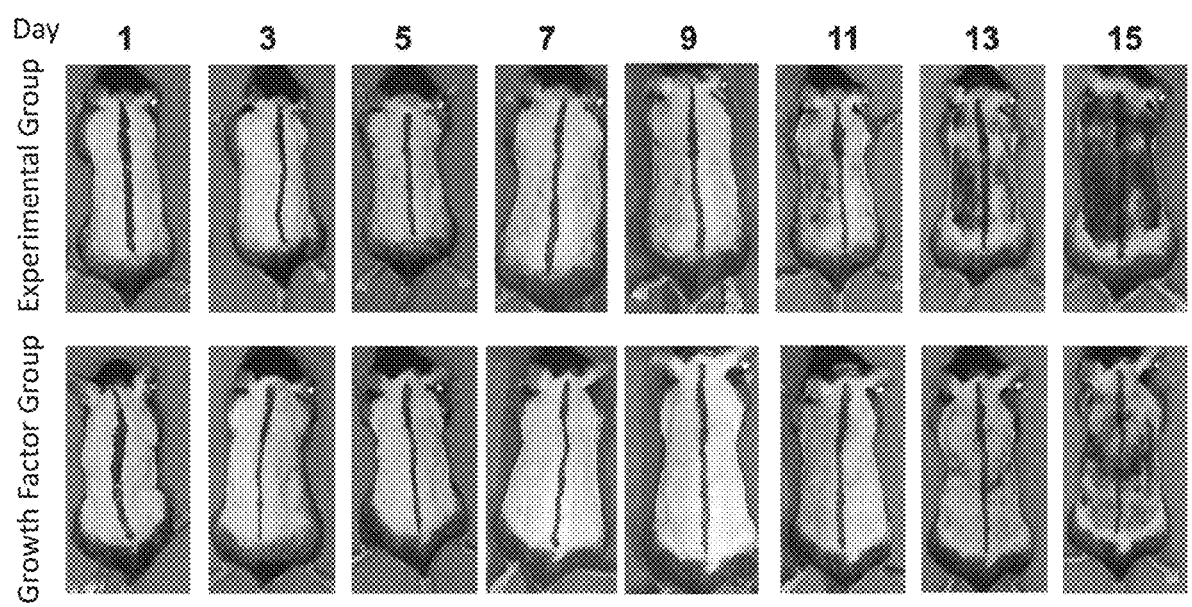
FIG. 1 shows a graph showing the effect of hair growth in mice in Example 2.

After extensive and in-depth research, the present inventors developed a use of acellular adipose tissue extract in promoting hair regeneration and/or retention through extensive screening and testing. In the present invention, after the adipose tissue is subjected to a series of treatments such as mechanical cutting, chylolysis, repeated freezing and thawing, and the like, and further by the method of centrifugation, the adipose extract liquid without oil droplets and living cell components is extracted. Unexpectedly, the inventors found that there is an obvious synergistic effect of multiple cytokines in the acellular adipose tissue extract in promoting hair growth/retention, which has excellent hair regeneration and/or hair retention promotion effects. The present invention has been completed on this basis.

Terms

Unless otherwise defined, all technical and scientific terms used herein have the same meaning as commonly understood by one of ordinary skill in the art to which this invention belongs.

As used herein, when used in reference to a specifically recited value, the term "about" means that the value may vary by no more than 1% from the recited value. For example, as used herein, the expression "about 100" includes all values between 99 and 101 (eg, 99.1, 99.2, 99.3, 99.4, etc.).

As used herein, the terms "contain" or "comprise (include)" may be open form, semi-closed form, and closed form. In other words, the terms also include "substantially consisting of" or "consisting of".

Acellular Adipose Tissue Extract

The acellular adipose tissue extract of the present invention is an extract obtained by removing lipid droplets and removing cells from adipose tissue.

Preferably, the acellular adipose tissue extract is extracted from allogeneic adipose tissue, such as human.

In another preferred embodiment, the fat extract is not SVF.

The tests show that the acellular adipose tissue extract contains the following components (but not limited to): insulin-like growth factor (IGF-1), brain-derived neurotrophic factor (BDNF), glial-derived neurotrophic factor (GDNF), vascular endothelial growth factor (VEGF), hepatocyte growth factor (HGF), transforming growth factor β (TGF-β), basic fibroblast growth factor (bFGF), platelet derived factor (PDGF), epidermal cells Growth factor (EGF), granulocyte colony stimulating factor (G-CSF).

Preparation Method

The acellular adipose tissue extract is obtained by subjecting the adipose tissue to mechanically cutting, chylolysis, repeating freezing and thawing, and then centrifuging.

Typically, the preparation method of the acellular adipose tissue extract of the present invention comprises the following steps:

(1) providing an adipose tissue raw material, shredding the adipose tissue raw material, and rinsing (eg, with physiological saline), thereby obtaining a rinsed adipose tissue;

(2) centrifuging the rinsed adipose tissue to obtain a layered mixture;

(3) discharging the excess liquid at the bottom and the grease on top from the layered mixture and collecting the intermediate layer (that is, the fat layer containing fat cells);

(4) subjecting the intermediate layer to mechanical emulsification to obtain a mechanically emulsified fat mixture (also called nano fat);

(5) centrifuging the mechanically emulsified fat mixture (may be combined or not) to obtain a transparent (or substantially transparent) intermediate liquid layer, which is an adipose primary extract; and (6) subjecting the adipose primary extract to filtration and sterilization to obtain the adipose extract without added ingredients.

Composition or Product, Use

The composition or product of the present invention includes the above-mentioned acellular adipose tissue extract.

The acellular adipose tissue extract of the present invention has the effect of promoting hair growth and/or retention. For example, the promotion of hair growth and/or retention includes, but is not limited to, promoting proliferation and/or activation of dermal papilla cells, delaying degeneration of hair follicle cells, promoting telogen follicles into the anagen phase, or a combination thereof.

In another preferred embodiment, the promoting hair growth includes promoting hair regeneration and/or hair growth and/or hair thickening.

In another preferred embodiment, the hair retention includes reducing hair loss and/or strengthening hair roots.

The compositions or products of the present invention can be used to treat and/or prevent alopecia.

Typically, the alopecia includes cicatricial and/or non cicatricial alopecia.

The cicatricial alopecia is selected from the group consisting of hair lichen planus, postmenopausal alopecia, alopecia lupus erythematosus, Brocq pseudoalopecia areata, dissecting celhlitis of the scalp, and a combination thereof.

The non cicatricial alopecia is selected from the group consisting of androgenetic alopecia, alopecia areata, temporal triangle alopecia, trichotillomania, senile alopecia, telogen effluvium, anagen hair loss syndrome, infectious alopecia, lipoedema alopecia, salt alopecia, sugar alopecia, tumor-related alopecia, or a combination thereof, preferably androgenetic alopecia, temporal triangle alopecia, telogen effluvium, infectious alopecia, and/or psychogenic alopecia.

The acellular adipose tissue extract of the present invention can be used directly. In addition, it should be understood that although it is not necessary to add any additives (or added ingredients) during the preparation of the extract of the present invention, some or small amounts of safe substances that do not negatively or adversely affect the activity of the extract of the present invention (such as small amount of water) may also be added. For example, the extract obtained after preparation can be used directly without added ingredients, for example (but not limited to), smeared on the skin or injected into the dermis at multiple points through a syringe.

The acellular adipose tissue extract of the present invention can be formulated into a pharmaceutical composition or a cosmetic composition with pharmaceutically or cosmetically acceptable carriers or excipients.

To the extent that the effects of the present invention are not hindered, other ingredients commonly used in cosmetics may be added into the cosmetics of the present invention, such as film formers, oil-soluble gelling agents, organically modified clay minerals, resins, moisturizers, preservatives, antibacterial agents, fragrances, salts, antioxidants, pH adjusters, chelating agents, cooling agents, anti-inflammatory agents, ingredients for skin beautification (whitening agents, cytoactive agents, skin roughness improving agents, blood circulation promoters, skin firming agents, anti-lipid leakage agents, etc.), vitamins, amino acids, nucleic acids, hormones, inclusion compounds and the like.

The oil-soluble gelling agent is selected from metal soaps such as aluminum stearate, magnesium stearate, and zinc myristate; amino acid derivatives such as N-lauroyl-L-glutamic acid, α,γ-di-n-butylamine; cyclodextrin fatty acid esters such as cyclodextrin palmitate, cyclodextrin stearate, and cyclodextrin 2-ethylhexanoic acid palmitate; sucrose fatty acid esters such as sucrose palmitate and sucrose stearate; benzylidene derivatives of sorbitol such as monobenzylidene sorbitol and dibenzylidene sorbitol; gelling agent of organically modified clay minerals such as dimethylbenzyldodecylammonium montmorillonite clay and dimethyldioctadecylammonium montmorillonite clay. One, two or more types of agents may be used as required.

Moisturizers include glycerin, sorbitol, propylene glycol, dipropylene glycol, 1,3-butanediol, glucose, xylitol, maltitol, polyethylene glycol, hyaluronic acid, chondroitin sulfate, pyrrolidone carboxylate, polyoxyethylene methyl glucoside, polyoxypropylene methyl glucoside and the like.

Antibacterial preservatives include alkyl p-hydroxybenzoate, benzoic acid, sodium benzoate, sorbic acid, potassium sorbate, phenoxyethanol, etc. Antibacterial agents include benzoic acid, salicylic acid, carbolic acid, sorbic acid, alkyl p-hydroxybenzoate, p-chloro-m-cresol, hexachlorophenol, benzalkonium chloride, chlorhexidine chloride, trichloro-N-carbanilide, triclosan, photosensitizer, phenoxyethanol and the like.

Antioxidants include tocopherol, butylhydroxyanisole, dibutylhydroxytoluene, phytic acid and the like. PH regulators include lactic acid, citric acid, glycolic acid, succinic acid, tartaric acid, dl-malic acid, potassium carbonate, sodium bicarbonate, ammonium bicarbonate and the like. Chelating agents include alanine, sodium ethylenediaminetetraacetate, sodium polyphosphate, sodium metaphosphate, phosphoric acid and the like. Cooling agents include L-menthol, camphor and the like. Anti-inflammatory agents include allantoin, glycyrrhetinic acid, glycyrrhizic acid, tranexamic acid, azulene and the like.

Ingredients for skin beautification include whitening agents such as placenta extract, arbutin, glutathione and saxifrage extract; cytoactive agents such as royal jelly, photoreceptor, cholesterol derivatives, calf blood extract; skin roughness improving agents; blood circulation promoters such as valeramide pelargonate, benzyl nicotinate, β-butoxyethyl nicotinate, capsaicin, gingerone, cantharidin tincture, ichthyol, caffeine, tannic acid, α-borneol, tocopherol nicotinate, inositol hexanicotinate, cyclomandelate, cinnarizine, tolazoline, acetylcholine, verapamil, stephane and γ-oryzanol; skin firming agents such as zinc oxide, tannic acid; anti-lipid leakage agents such as sulfur. Vitamins include vitamin A such as vitamin A oil, rosin oil, rosin acetate, rosin palmitate; vitamin B2 such as riboflavin, riboflavin butyrate and flavin adenine nucleotides; vitamin B6 such as pyridoxine hydrochloride, pyridoxine dicaprylate, pyridoxine tripalmitate; vitamin B such as vitamin B12 and its derivatives, vitamin B15 and its derivatives; vitamin C such as L-ascorbic acid, L-ascorbyl dipalmitate, sodium L-ascorbate-2-sulfate and dipotassium L-ascorbate phosphate diester; vitamin D such as ergocalciferol and cholecalciferol; vitamin E such as α-tocopherol, β-tocopherol, γ-tocopherol, dl-α-tocopherol acetate, dl-α-tocopherol nicotinate, dl-α-tocopherol succinate; vitamin H; vitamin P; niacin such as nicotinic acid, benzyl nicotinate, niacinamide; pantothenic acid such as calcium pantothenate, D-panthenol, pantothen ethyl ether and acetyl pantothen ethyl ether; biotin and the like.

Amino acids include glycine, valine, leucine, isoleucine, serine, threonine, phenylalanine, arginine, lysine, aspartic acid, glutamic acid, cystine, cysteine, methionine and tryptophan. Nucleic acids include deoxyribonucleic acid and the like, and hormones include estradiol, vinyl estradiol and the like.

There is no particular limitation on the form of the product, and it may be liquid, emulsion, cream, solid, paste, gel, powder, multilayer, mousse, spray, and the like.

Preferred examples of the composition or product of the present invention include (but not limited to) hair growth and/or retention lotion, hair growth and/or retention ointment, hair growth and/or retention compress, shampoo, conditioner, hair gel, mousse, lotion, hair cream, hair mask, hair dye, eyebrow rejuvenator, eyelash rejuvenator or eyelash nourisher, hair serum, scalp conditioner.

The acellular adipose tissue extract of the present invention directly reaches the dermis layer to maximize its effect. It is usually injected directly into the scalp through a syringe, but the method is cumbersome, time-consuming, and very dangerous, and need high requirement for operators.

Therefore, a more preferred class of products of the present invention is compress with arrays of microneedles. For example, the compress includes a substrate, and an array of microneedles immobilized on the substrate, and the compress contains acellular adipose tissue extract as an active ingredient.

The acellular adipose tissue extract can be prepared into microneedle shape together with carrier and the microneedles are fixed on a substrate. For example, it can be prepared by the method disclosed in CN 109069817 A, the entire contents of which are incorporated herein by reference. The acellular tissue extract as drug was mixed with a carrier.

In addition, the acellular adipose tissue extract can be prepared into an elastic gel, which is then coated on the substrate with an array of microneedles. For example, it can be prepared by the methods disclosed in CN 109077938 A, the entire contents of which are incorporated herein by reference.

The length of the microneedles preferably makes it reach the dermis, especially the papillary dermis. Preferably, the length of the microneedles is 0.05 mm-1.5 mm, preferably 0.1 mm-1.0 mm, more preferably 0.2 mm-0.5 mm.

The area of the compress can be adjusted according to the site of use, preferably, the area of the compress is 0.0001-0.1 $m^2$, preferably 0.005-0.05 $m^2$, 0.001-0.02 $m^2$.

The substrate is preferably a flexible substrate.

In another preferred embodiment, the material of the substrate is a hyposensitive or desensitized material.

The Main Advantages of the Present Invention Include:
1. The present invention finds that a variety of cytokines in the acellular adipose tissue extract have obvious synergistic effects in promoting hair growth/retention, and have excellent effects on promoting hair regeneration and/or hair retention for the first time.
2. The acellular adipose tissue can be directly prepared from adipose tissue, contains a variety of growth factors, and is from natural sources and easy and convenient to prepare and use.
3. The acellular adipose tissue extract does not contain lipid droplets and reduces possible side effects; does not contain cellular components, thus removing immunogenicity; is mild and safe;
4. The acellular adipose tissue extract can realize the application of allogeneic adipose extract, and realize mass production and quality control;
5. The acellular adipose tissue extract is easy to cryopreserve and maintains its biological activity. There is no need to add protective agents during cryopreservation, which avoids the pollution of other chemical components. The operation is simple and the practicability is strong.

The present invention will be further explained below in conjunction with specific examples. It should be understood that these examples are only used to illustrate the present invention and not to limit the scope of the present invention. The experimental methods that do not indicate specific conditions in the following examples are generally performed under the conventional conditions or according to the manufacturer's instructions. Unless indicated otherwise, percentage and parts are calculated by weight.

Example 1

1. Preparation and Composition Analysis of Acellular Adipose Tissue Extract

Preparation Method

Adipose was obtained from volunteers with informed consent. The extraction method was as follows:
(1) The adipose was obtained by suction or surgical excision, cut into pieces, and rinsed three times with physiological saline.
(2) The rinsed adipose tissue was put into a 50 ml centrifuge tube (about 30-50 ml per tube), then put in a centrifuge and centrifuged at 1200 rpm for 3 minutes to obtain a layered mixture.
(3) The excess liquid at the bottom and grease on top were discharged from the layered mixture, and the intermediate layer (ie, the fat layer containing adipocytes) was collected.
(4) The intermediate layer was blown about 60-120 times by two 10 ml injection syringes connected with a tee tube to perform mechanical emulsification, thereby obtaining a mechanically emulsified fat mixture (also called nano fat).
(5) The mechanically emulsified fat mixture (may be combined or not) was put into a 50 ml test tube, centrifuged at 1500 rpm for 5 minutes, and the transparent liquid in the middle of test tube was collected, which is adipose primary extract. Alternatively, the mechanically emulsified fat mixture was placed in a −80° C. refrigerator (or liquid nitrogen) for freezing, and then thawed in a water bath (eg, placed in a water bath at 20-37° C.), and the freeze-thaw was repeated 1-2 times. The thawed mixture was centrifuged at 1500 rpm for 5 minutes, and the transparent liquid in the middle of the centrifuge tube was collected, which is the adipose primary extract.

(6) The adipose primary extract was passed through a 0.22 μm filter to sterilize and remove live cells that may be mixed, thereby obtaining an adipose extract without added ingredients. After the adipose extract was sub-packaged, it was stored at −20° C. until use. It can be used directly after thawing at room temperature, or stored at a low temperature (eg, 4° C.) for a period of time after thawing then use.

Content Analysis

The obtained adipose extract was tested for growth factor content using ELISA immunosorbent assay kit, including cytokines such as IGF-1, BDNF, GDNF, bFGF, VEGF, TGF-β, HGF and PDGF.

ELISA analysis was performed on biological materials prepared from six donor-derived fats, and the results are shown in Table 1: (unit: pg/mL)

TABLE 1

| Samples | 1 | 2 | 3 | 4 | 5 | 6 |
|---|---|---|---|---|---|---|
| IGF-1 | 14834.37 | 12394.01 | 9916.26 | 12454.56 | 11666.78 | 7343.9 |
| BDNF | 1942.6 | 2329.63 | 1192.41 | 1620.71 | 1438.56 | 2642.01 |
| GDNF | 1487.5 | 2024.76 | 1250.52 | 1934.82 | 1643.64 | 2598.16 |
| TGF-β | 650.26 | 861.91 | 388.47 | 585.66 | 1175.98 | 2456.05 |
| HGF | 388.65 | 1108.36 | 1287.66 | 673.82 | 324.5 | 329.84 |
| bFGF | 192.18 | 245.21 | 333.68 | 284.71 | 127.35 | 192.46 |
| VEGF | 192.38 | 208.49 | 193.09 | 152.84 | 206.69 | 230.16 |
| PDGF | 150.3 | 172.29 | 142.66 | 191.15 | 163.1 | 232.06 |
| EGF | 63.11 | 83.27 | 47.98 | 173.23 | 125.2 | 339.14 |
| NT-3 | 59.5 | 71.77 | 45.12 | 40.24 | 67.17 | 71.14 |
| G-CSF | 19.8 | 25.47 | 20.46 | 27.85 | 22.96 | 27.32 |

The average concentrations of 6 samples detected are as follows: IGF-1 (9840.6±2960.9 pg/ml), BDNF (1764.5±583.5 pg/ml), GDNF (1831.9±467.7 pg/ml), bFGF (242.3±73.0 pg/ml), VEGF (202.9±28.4 pg/ml), TGF-β1 (954.5±806.5 pg/ml), HGF (898.4±545.5 pg/ml), PDGF (179.9±30.3 pg/ml).

Example 2

FE Promotes Hair Growth in Normal C57 Mice

Growth factors IGF-1, VEGF, and bFGF contained in acellular adipose tissue extract (FE) have been reported to be related to hair growth. To compare the efficacy of the combination administration of these known ingredients with that of acellular adipose tissue extract, a hair growth-related growth factor solution (containing IGF-1 (12000 pg/mL), VEGF (200 pg/mL) and bFGF (250 pg/mL)) with a concentration close to acellular adipose tissue extract was used as the growth factor group; acellular adipose tissue extract (sample 4) was used as the experimental group; normal saline was used as the control group.

There were 12 C57 mice, 7 week-old, wherein 6 mice were in the experimental group and 6 mice were in the growth factor group. The back was shaved using a razor a day in advance, and the hair was removed completely by using a depilatory cream. From the first day, the mice in the experimental group were injected subcutaneously with acellular adipose tissue extract on the left side of the back and normal saline was injected on the right side; the mice in the growth factor group were injected subcutaneously with growth factor solution on the left side of the back and normal saline was injected on the right side. The injection site is about 1 cm away from the midline, and multiple injections were performed parallel to the midline. The injection dose was 25 microliters per point. The injection frequency was once a day for 7 consecutive days. Photographs were taken at 1, 3, 5, 7, 9, 11, 13, and 15 days to observe hair growth.

The experimental results are shown in FIG. 1. After the back of the C57 mice in the experimental group was shaved with a razor, the left side was subcutaneously injected with acellular adipose tissue extract, and the right side was injected with normal saline. After the back of the C57 mice in the growth factor group was shaved with a razor, growth factors were injected subcutaneously on the left side and normal saline was injected on the right side.

Photographs were taken on days 1, 3, 5, 7, 9, 11, 13, and 15, respectively. The experimental results are shown in FIG. 1. It can be seen that the skin on the side injected with acellular adipose tissue extract (left side) of the experimental group became darker on the 9th day, and the hair erupted on the 11th day. The skin on the side injected with normal saline (right side) became darker on the 11th day, and the hair erupted on the 13th day. The new hair area of the acellular adipose tissue extract side was significantly larger than that of the saline side, suggesting the acellular adipose tissue extract accelerated hair regeneration; however, there was no significant difference in hair growth area and speed between the growth factor injection side (left side) and the normal saline injection side (right side) in the growth factor group.

It shows that in addition to the factors related to hair growth, the acellular adipose tissue extract also exerts the effect of promoting hair growth through other ways, and its components have a significant synergistic effect in promoting hair growth.

Example 3

FE Promotes Androgenetic Alopecia Mouse Hair Growth Model

There were 6 C57 mice, 7 week-old. The back was shaved using a razor a day in advance, and the hair was removed completely by using a depilatory cream. 3 mg of dihydrotestosterone (DHT) was injected subcutaneously in the neck to simulate androgenetic alopecia. After modeling, the mice were divided into the FE group and the control group. The mice in the FE group were injected with acellular adipose tissue extract FE (sample 4) at multiple points on the back, and the control group was injected with normal saline. The injection dose was 25 microliters per point. The frequency of injection was once a day for 7 consecutive days. Photographs were taken every week to observe hair growth, the observation period was 14 days.

Figure 2:
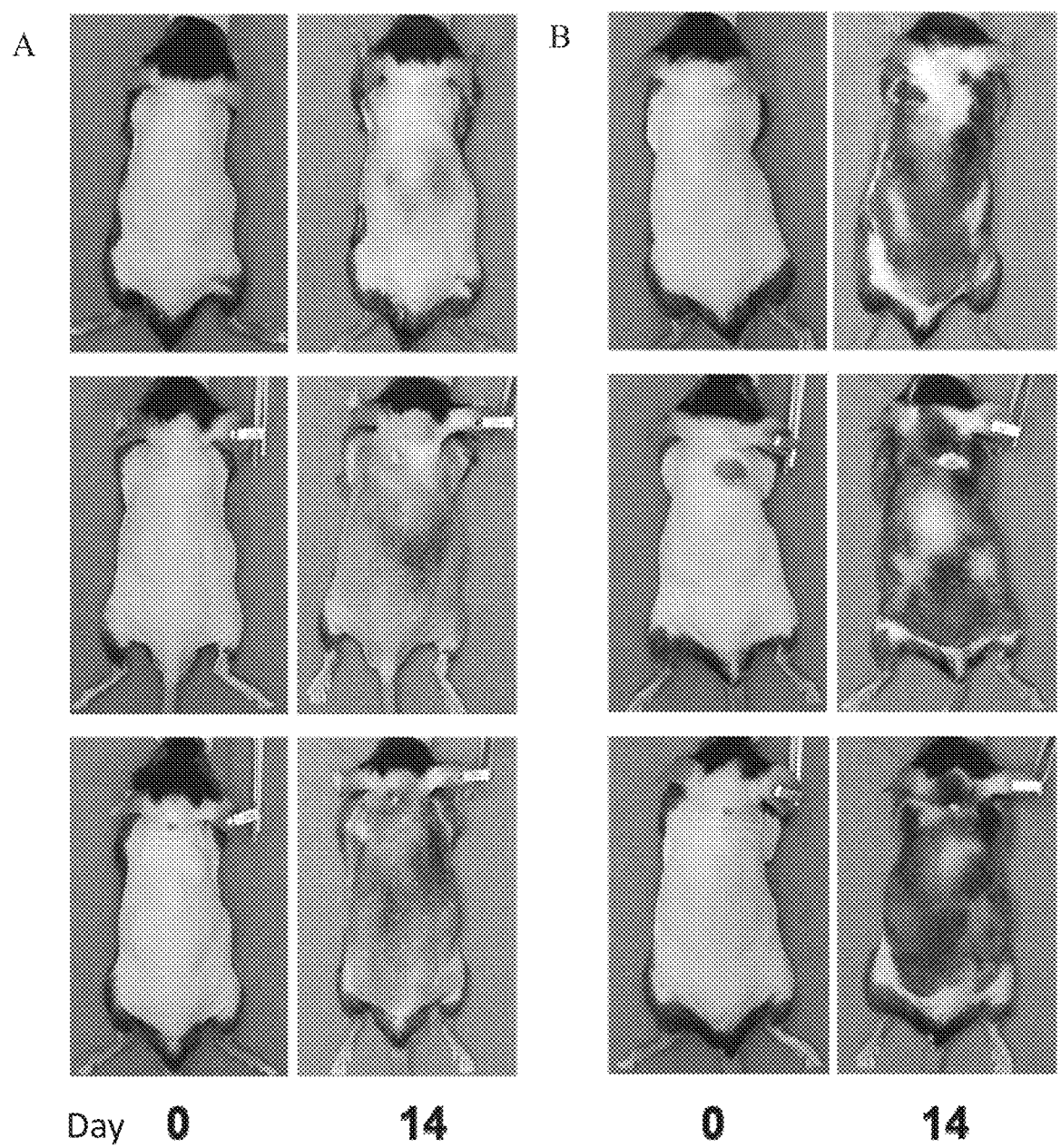
FIG. 2 shows a graph showing the effect of hair growth in mice in Example 3.

In the androgenetic alopecia model simulated by dihydrotestosterone, the mice were divided into acellular adipose tissue extract group (FE group) and normal saline group (control group). As shown in FIG. 2, the skin color of the mice became darker and a small amount of hair sprouted locally on the 14th day in control group (A). On the 14th day, hair sprouting in most areas of the mice could be observed in FE group (B), and the area and hair length were significantly larger than those of the control group, indicating that the acellular adipose tissue extract can promote hair regeneration in mice with androgenetic alopecia.

In conclusion, the acellular adipose tissue extract has an excellent effect of promoting hair growth. Surprisingly, compared with the case where only known hair growth-related factors are contained, the acellular adipose tissue extract contains many different natural factors, which has a significant synergistic effect in promoting hair growth, so as to promote hair growth safely, mildly and efficiently, and experiments have proved that acellular adipose tissue extract can be used for alopecia caused by a variety of reasons.

3. Discussion

Tonnard first proposed the concept of nano-fat. Nano-fat containing lipid droplets, vascular matrix components (SVF) and growth factors can be obtained after mechanical emulsification of the fat obtained by liposuction. Nano-fat mainly works through SVF. SVF contains endothelial cells, adipose stem cells, macrophages, etc. On the one hand, cells can directly participate in tissue formation, and on the other hand, cells can promote tissue regeneration by secreting cytokines.

The difference from the previous study is that the living cells and lipid droplets in the nano-fat are removed by centrifugation and filtration in the present invention, and the growth factor components are retained. The growth factor components therein are rich in type, including factors related to angiogenesis, factors related to nerve regeneration, factors related to inflammation, and factors related to hair regeneration, etc. Animal experiments have shown that local injection of acellular adipose tissue extract can promote hair regeneration and accelerate hair growth in both normally shaved mice and in mouse model of androgen-induced depilation. Because acellular adipose tissue extract contains a variety of growth factors, its mechanism of action can play a role in many aspects: 1. promoting new blood vessel formation and improving local blood supply; 2. regulating local inflammatory response; 3. promoting nerve regeneration and improving nerve nourishes; 4. stimulating the proliferation and differentiation of dermal papilla cells. Therefore, the acellular adipose tissue extract can improve the condition of hair follicle cells and dermal papilla while promoting hair growth, thus playing a role in hair retention.

Compared with nano-fat, the acellular adipose tissue extract of the present invention has wider application prospects. Firstly, lipid droplet components are removed, and possible side effects are reduced; secondly, the cell components are removed, thus removing the immunogenicity, the application of allogeneic adipose extract can be realized in the future, and mass production and quality control can be realized; thirdly, it is easy to cryopreserve and maintain biological activity, and no protective agent is required during cryopreservation, avoiding the contamination of other chemical components.

All the documents cited herein are incorporated into the invention as reference, as if each of them is individually incorporated. Further, it would be appreciated that, in light of the above-described teaching of the invention, the skilled in the art could make various changes or modifications to the invention, and these equivalents are still in the scope of the invention defined by the appended claims of the application.

The invention claimed is:

1. A method for promoting hair regeneration and/or retention, comprising the step of: administering an acellular adipose tissue extract or a composition or product containing the acellular adipose tissue extract to a subject in need thereof;
   wherein the acellular adipose tissue extract is prepared by the following method, and the method comprises the following steps:
   (1) providing an adipose tissue as raw material, shredding the adipose tissue raw material, and rinsing, thereby obtaining a rinsed adipose tissue;
   (2) centrifuging the rinsed adipose tissue to obtain a layered mixture;
   (3) discharging the excess liquid at the bottom and the grease on top from the layered mixture and collecting the intermediate layer;
   (4) subjecting the intermediate layer to mechanical emulsification to obtain a mechanically emulsified fat mixture;
   (5) centrifuging the mechanically emulsified fat mixture to obtain a transparent or substantially transparent intermediate liquid layer, which is an adipose primary extract; and
   (6) subjecting the adipose primary extract to filtration and sterilization to obtain the adipose extract without added ingredients;
   wherein the adipose tissue is human adipose tissue;
   and the acellular adipose tissue extract comprises 6000-20000 pg/ml insulin-like growth factor (IGF-1); 1000-4000 pg/ml brain-derived neurotrophic factor (BDNF), and 1000-4000 pg/ml glial-derived neurotrophic factor (GDNF).

2. The method according to claim 1, wherein the acellular adipose tissue extract contains one or more components selected from the group consisting of: vascular endothelial growth factor (VEGF), liver growth factor (HGF), transforming growth factor β (TGF-β), basic fibroblast growth factor (bFGF), platelet derived factor (PDGF), epidermal growth factor (EGF), granulocyte colony stimulating factor (G-CSF), and/or a combination thereof.

3. The method according to claim 2, wherein the acellular adipose tissue extract comprises one or more features selected from the group consisting of:
   (1) the concentration of IGF-1 is 7000-15000 pg/ml;
   (2) the concentration of BDNF is 1200-2500 pg/ml;
   (3) the concentration of GDNF 1200-2500 pg/ml;
   (4) the concentration of bFGF is 100-500 pg/ml;
   (5) the concentration of the VEGF is 100-400 pg/ml;
   (6) the concentration of TGF-β1 is 200-3000 pg/ml;
   (7) the concentration of the HGF is 200-3000 pg/ml; and/or
   (8) the concentration of PDGF is 80-400 pg/ml.

4. The method according to claim 2, wherein the acellular adipose tissue extract comprises one or more features selected from the group consisting of:
   (1) the weight ratio of IGF-1 to VEGF is 20-100:1;
   (2) the weight ratio of BDNF to VEGF is 2-20:1;
   (3) the weight ratio of GDNF to VEGF is 2-20:1;
   (4) the weight ratio of bFGF to VEGF is 0.2-8:1;
   (5) the weight ratio of TGF-β1 to VEGF is 1-20:1;
   (6) the weight ratio of HGF to VEGF is 1-20:1; and/or
   (7) the weight ratio of PDGF to VEGF is 0.1-3:1.

5. The method according to claim 1, wherein the promoting hair growth and/or retention comprises promoting the proliferation and/or activation of dermal papilla cells, delaying the degeneration of hair follicle cells, promoting the telogen hair follicles to enter the anagen phase, or a combination thereof.

6. The method according to claim 1, wherein the promoting hair growth includes promoting hair regeneration and/or hair growth and/or hair thickening.

7. The method according to claim 1, wherein the hair retention includes reducing hair loss and/or strengthening hair roots.

8. The method according to claim 1, wherein the promoting hair growth and/or retention includes treating and/or preventing alopecia, the alopecia includes cicatricial alopecia and/or non cicatricial alopecia.

9. The method according to claim 8, wherein the cicatricial alopecia is selected from the group consisting of hair lichen planus, postmenopausal alopecia, lupus erythematosus alopecia, Brocq pseudoalopecia areata, dissecting celhlitis of the scalp, and a combination thereof.

10. The method according to claim 8, wherein the non cicatricial alopecia is selected from the group consisting of androgenetic alopecia, alopecia areata, temporal triangle alopecia, trichotillomania, senile alopecia, telogen effluvium, anagen hair loss syndrome, infectious alopecia, lipoedema alopecia, salt alopecia, sugar alopecia, tumor-related alopecia, and a combination thereof.

11. The method according to claim 8, wherein the non cicatricial alopecia is selected from the group consisting of androgenetic alopecia, temporal triangle alopecia, telogen effluvium, infectious alopecia, and/or psychogenic alopecia.

12. The method according to claim 1, wherein the composition or product is selected from the group consisting of hair growth and/or retention lotion, hair growth and/or retention ointment, hair growth and/or retention compress, shampoo, conditioner, hair gel, mousse, lotion, hair cream, hair mask, hair dye, eyebrow rejuvenator, eyelash rejuvenator or eyelash nourisher, hair serum, scalp conditioner, and a combination thereof.

13. The method according to claim 1, before the centrifugation step of step (5), the method further comprises subjecting the mechanically emulsified fat mixture to a freeze-thaw treatment.

14. A method for promoting hair regeneration and/or retention, comprising the step of: administering a compress containing the acellular adipose tissue extract according to claim 1 as active ingredient to a subject in need thereof;
wherein the compress comprising:
a substrate, and an array of microneedles immobilized on the substrate, and the compress contains an acellular adipose tissue extract as active ingredient.

* * * * *